US012597099B2

(12) United States Patent
Kraning

(10) Patent No.: US 12,597,099 B2
(45) Date of Patent: Apr. 7, 2026

(54) PRESENTATION SYSTEM HAVING STATIC AND DYNAMIC COMPONENTS

(71) Applicant: Jason Kraning, Greenville, SC (US)

(72) Inventor: Jason Kraning, Greenville, SC (US)

( * ) Notice: Subject to any disclaimer, the term of this patent is extended or adjusted under 35 U.S.C. 154(b) by 378 days.

(21) Appl. No.: 18/317,163

(22) Filed: May 15, 2023

(65) Prior Publication Data

US 2023/0289937 A1 Sep. 14, 2023

Related U.S. Application Data

(63) Continuation-in-part of application No. 16/830,149, filed on Mar. 25, 2020, now Pat. No. 11,684,192.

(60) Provisional application No. 62/823,603, filed on Mar. 25, 2019.

(51) Int. Cl.
| | | |
|---|---|---|
| *G06T 5/50* | (2006.01) | |
| *G03B 21/14* | (2006.01) | |
| *G06F 3/14* | (2006.01) | |

(52) U.S. Cl.
CPC .............. *G06T 5/50* (2013.01); *G03B 21/14* (2013.01); *G06F 3/14* (2013.01); *G06T 2207/20221* (2013.01)

(58) Field of Classification Search
None
See application file for complete search history.

(56) References Cited

FOREIGN PATENT DOCUMENTS

JP 2018114218 A * 7/2018

* cited by examiner

*Primary Examiner* — Bao-Luan Q Le
*Assistant Examiner* — Danell L Owens
(74) *Attorney, Agent, or Firm* — Kim and Lahey Law Firm, LLC; Seann P. Lahey

(57) ABSTRACT

A presentation system for a celebration of an individual comprising: a frame; a lighting system disposed along an inner edge of a perimeter of the frame; a fabric removably attached to the frame disposed outwardly from the lighting system adapted to be illuminated by the lighting system; an image included on the fabric associated with aspects of a subject of the celebration of the individual; and, a memorial container disposed in front of the fabric wherein the image and the memorial container cooperate to form a composite image when viewed by an audience.

5 Claims, 8 Drawing Sheets

PRESENTATION SYSTEM HAVING STATIC AND DYNAMIC COMPONENTS

BACKGROUND OF THE INVENTION

1) Field of the Apparatus

This system is directed to a customizable display for events, to associate the displayed images environment with the subject matter or purpose of the event.

2) Description of the Related Art

At the end of life, it is common for the recently passed individual to be viewed for a final time by family, friends and other mourners. Traditionally, this event occurs at a funeral home with the recently deceased lying in a casket placed in a room allowing mourners to walk up to the casket, view the deceased, and pay their last respects.

In modern times, the funeral event is held soon after death. In North America, this means no longer than one or two weeks from death. One reason for the short period of time is that the body begins to decompose which causes the funeral to become time sensitive for several reasons. The specific time between death and the mourning is a balance of competing interests including organizing the mourners, having a suitable and respectful period of grieving, and allowing the close mourners time to find closure.

In practice, the time between the death and the funeral is around two to three days because the body will decompose and cease to be presentable for an open casket service. Some families choose to have the body embalmed in order to preserve it longer, to expand the time between the death and the funeral. But this is a costly option, and due to the chemicals used in the embalming process, it may be detrimental to the environment if the body is buried.

Traditionally, funerals are somber events in the presentation, decorations and mood of the event, for obvious reasons. Increasingly, the funeral ceremony pays tribute to the deceased person's life instead of mourning their death. Instead of looking ahead to the afterlife, funerals are increasingly rejoicing memories of the deceased person's triumphs, relationships, activities, and other aspects of life. Unfortunately, the drab decor common to many funeral homes is contrary to this trend.

In recent time, there is also a movement to a closed-casket ceremony. This option is popular when the time between the death and the funeral needs to be expanded or for certain non-traditional funeral arrangements, such as a "celebration of life" ceremony. A celebration of life ceremony has been described as an orderly and potentially spiritual transition of the deceased from one social status to another. It can be directed to telling the story of the deceased person rather than mourning the death. Celebrations of life can be where "mourners" gather to celebrate the unique personality and achievements of the deceased, rather than to merely witness or mark the death and mourning with the survivors. Celebrations of life are more flexible and creative in their organization as they are dependent upon the deceased, rather than a traditional funeral service dictated by tradition or religion. Celebrations of life are commonly held after the physical remains have been cared for through burial or cremation because they require more time to plan the event. This time is needed to allow the presentation of the deceased person's life and event planning to properly celebrate the life of the individual based upon that specific individual's life.

The challenge is that with the growing popularity of the celebration of life, the traditional visitation, funeral services and committal services are not well suited to accomplish the goals, mood or presentation of the celebration of life. Further, the customization of the event or presentation is challenging at the traditional funeral services. In Japan, there have been several attempts to customize the funeral service to the deceased such as with Japanese Patent Publication 2018/129764 which is directed to a funeral content image projection system which allows for projecting an image, including a content for use in the funeral, during the funeral services. Japanese Patent JPH10243871 is directed to a system designed to introduce the attendees with the specifics of the deceased life even when those attendees were not that well acquainted with the deceased. Disadvantages with these systems include the need for a projector, the inability to have memorial articles from the celebration of life, requirement of the grieving survivors to provide images and other material about the deceased and that the presentation requires electrical power.

It would be advantageous to have an event presentation that can be tailored to the deceased person's life without the time lag normally associated with creating customized displays.

It would be advantageous to have an event presentation that included memorial articles for attendees associated with the deceased and the celebration of life.

It would be advantageous to have an event presentation system that can use easily replaceable images.

BRIEF SUMMARY OF THE INVENTION

The above objectives are accomplished by providing a presentation system comprising a frame; a lighting system disposed along an inner edge of a perimeter of the frame; a fabric removably attached to the frame disposed outwardly from the lighting system adapted to be illuminated by the lighting system; an image included on the fabric associated with aspects of a subject of the celebration of the individual; and, a memorial container disposed in front of the fabric wherein the image and the memorial container cooperate to form a composite image when viewed by an audience, wherein the composite image includes a right lateral portion that extends from above the memorial container to below the memorial container and a left lateral portion that extends from above the memorial container to below the memorial container.

In a further advantageous embodiment, the lighting system includes a lighting controller adapted to vary a brightness and a color of the lighting system.

In a further advantageous embodiment, the lighting controller is actuated by a motion sensor.

In a further advantageous embodiment, the memorial container is one of a casket or urn.

In a further advantageous embodiment, the memorial container is disposed on a stand and the right lateral portion and the left lateral portion extend to a lower edge of the stand.

In a further advantageous embodiment, a projector is provided displaying dynamic images on one of the fabric, the memorial container, the right lateral portion, the left lateral portion and any combination thereof.

In a further advantageous embodiment, the image is a first image; and, a display adapted to display a second image is associated with the first image so that the first image and the second image provide a customizing composite image according to the celebration of the individual.

In a further advantageous embodiment, an audio system is included for providing audio associated with the celebration of the individual.

In a further advantageous embodiment, the fabric is adapted to be converted into a memorial article according to the celebration of the individual.

In a further advantageous embodiment, the fabric is custom printed for memorializing the celebration of the individual.

In a further advantageous embodiment, the fabric is adapted to be segmented into segments that can be converted into a memorial article.

The above objectives are further accomplished according to the present invention by providing a presentation system for a celebration of an individual comprising a fabric having an image included on the fabric wherein the image is defined by aspects of a customized celebration of the individual; a right lateral portion included in the fabric; a left lateral portion included in the fabric; a lighting system adapted to illuminate the fabric from behind the fabric and including a lighting controller adapted to vary a brightness and a color of the lighting system; a memorial container containing a remains of the individual and disposed in front of the fabric wherein the image, right lateral portion, left lateral portion and the memorial container cooperate to form a composite image when viewed from a front perspective by an audience; and, wherein the right lateral portion extends past a first distal end of the memorial container when viewed from the front perspective by an audience, and the left lateral portion extends past a second distal end of the memorial container opposite the first distal end when viewed from the front perspective by an audience.

In a further advantageous embodiment, the memorial container is a one or a casket or urn.

In a further advantageous embodiment, a stand is included supporting the memorial container.

In a further advantageous embodiment, the image is a first image; and, a display adapted to display a second image wherein the second image is associated with the first image so that the first image and the second image provide a customizing composite image according to the celebration of the individual.

The above objectives are further accomplished according to the present invention by providing a presentation system for a celebration of an individual comprising a frame; a fabric removably attached to the frame; an image printed on the fabric illuminated by a light source disposed behind the fabric; a memorial container disposed in front of the fabric; a stand having a base section and a top platform interconnected by at least one riser, wherein the memorial container is carried on the top platform; a projector platform carried by the stand and operable between a retracted position disposed within the stand an extended position disposed lateral outward from at least a portion of the stand; a projector carried by the projector platform displaying dynamic images on one of the fabric, the memorial container, and any combined portions thereof; and, wherein the image printed on the fabric, dynamic images displayed by the projector, the stand, and the memorial container cooperate to form a composite image when viewed by an audience, and wherein the fabric extends from above the memorial container to the bottom of the stand.

In a further advantageous embodiment, the memorial container is one of a casket or an urn.

In a further advantageous embodiment, at least one of the base section, the riser, the top platform and the projector platform are comprised of a transparent material.

In a further advantageous embodiment, the projector platform is carried on at least one slidable rail mounted to the base section for moving between the retracted and extended positions.

In a further advantageous embodiment, a plurality of casters are disposed on a bottom side of the base section to facilitate movement of the stand relative to the fabric to prepare the composite image.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

Figure 1:
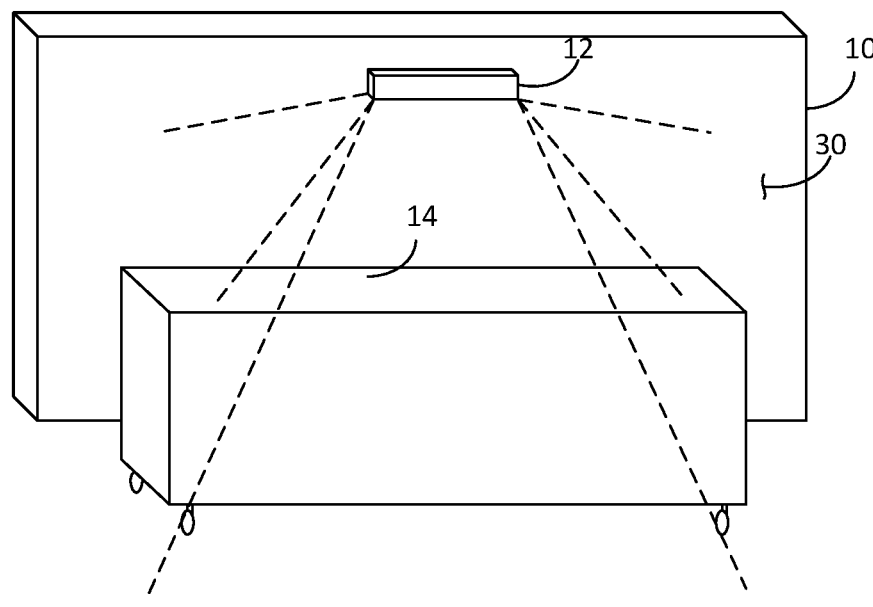
FIG. 1 is a perspective of aspects of the system.
Figure 2:
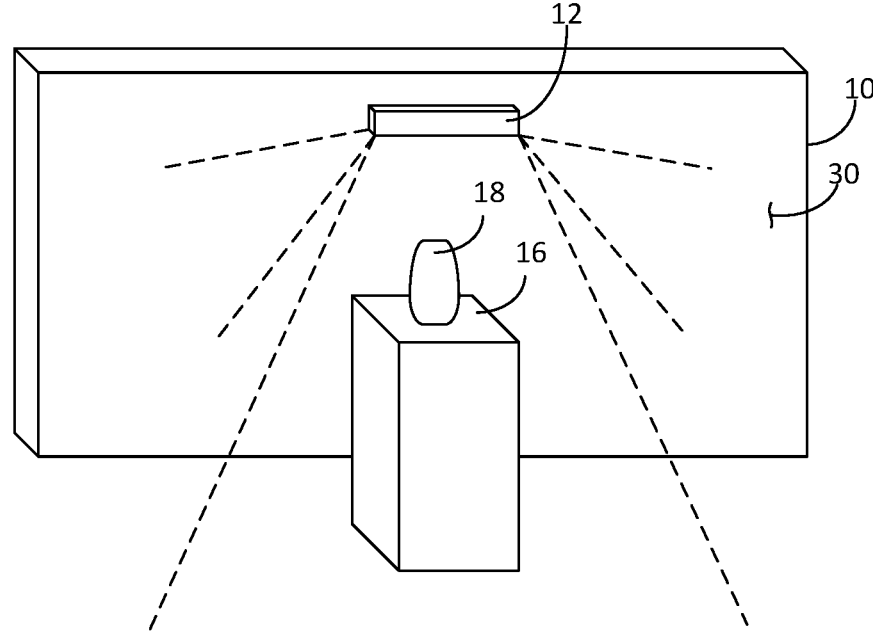
FIG. 2 is a perspective of aspects of the system.

With reference to the drawings, the invention will now be described in more detail. Referring to FIGS. 1 and 2, a frame 10 having internal lighting can be positioned behind a casket 14 or urn 18 and stand 16. The internal lighting can be positioned on an opposite side from the casket or urn so that the image on a fabric or screen is illuminated with rear lighting. The frame can be square, rectangular or other shape with lights, such a LED lights, around the inner walls of the perimeter to provide lighting within the frame and to provide rear illuminations of the screen. The lighting can be modified as to color and brightness allowing for different lighting conditions within the frame and projected outward from the frame. A lighting controller can be used to actuate predetermined lighting conditions based upon the screen placed on the frame so that custom lighting setting need not be required for each screen placed on the frame. For example, a first screen can have an image of outdoor sports, such as fishing, tennis, golf and the like. A second screen can include indoor activities such as pool, bowling, cooking, and the like. The lighting controller can have a first setting associated with the first screen so that the first screen setting is brighter to correspond with the outdoor activity. The lighting controller can have a second setting associated with the second screen so that the second screen setting is dimmer to correspond with the indoor activity.

The frame can receive flexible and removable screens that can be made from fabric 30 having images printed on the fabric. The image, being rear lit or backlit, can have high resolution and vibrant colors to support the decor of a celebration of life. The image can be associated with the deceased and reflect some aspect specific to the deceased's life such as a hobby, interest, profession and the like. As the fabrics are removable, they can be easily replaced for each celebration allowing for customizing the image for each celebration. The casket 14, urn 18 and stand 16 can be positioned in front of the frame and the image designed to accent the casket or stand and urn, rather than be blocked by the casket, stand or urn. A projector 12 can be included in the assembly that can project a second image that can cooperate with the frame image, casket or urn, stand and floor. The projector can be activated by motion, proximity or other means and modify the projected image accordingly.

Figure 3A:
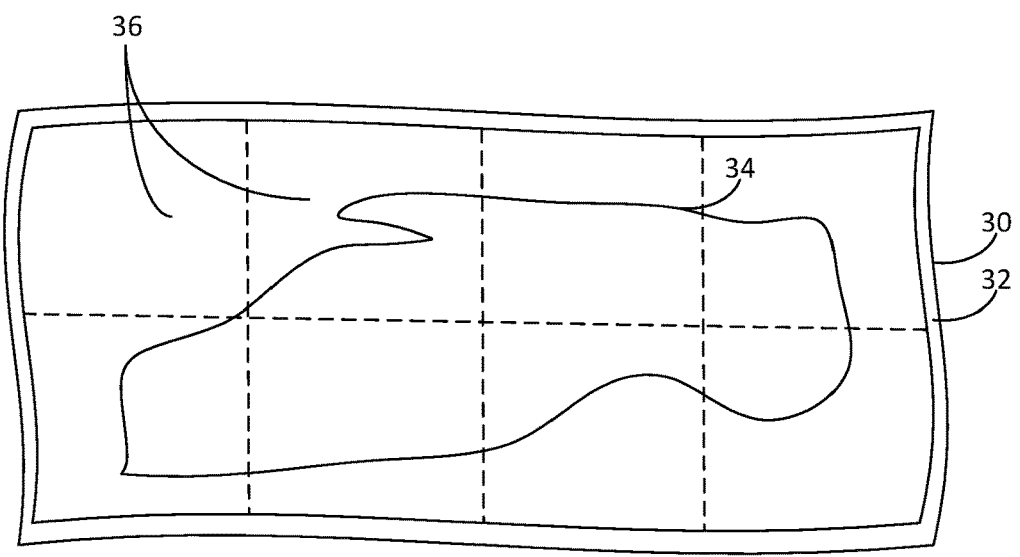
FIG. 3A is a front view of aspects of the system.

Referring to FIG. 3A, the fabric 30 includes a perimeter edge 32 which can be removably affixed to the frame using hook and loop fasteners, snaps, clips, adhesive, magnets, and the like. The image 34 is imprinted on the fabric, associated with or related to the deceased, and can be one or many in an existing inventory. When an event is planned, the organizer can provide a catalog or listing of the available images that can be selected as associated with the event. For example, sporting events, nature, outdoors, branches, scenes and the like. The frame can be installed at the event location and used for multiple events, funerals, celebrations of life or other events. The organizer rents the fabric, it is delivered to the location of the event, installed and viewed at the event. When the event is completed, the fabric can be returned into inventory for subsequent order, rent or use.

Figure 3B:
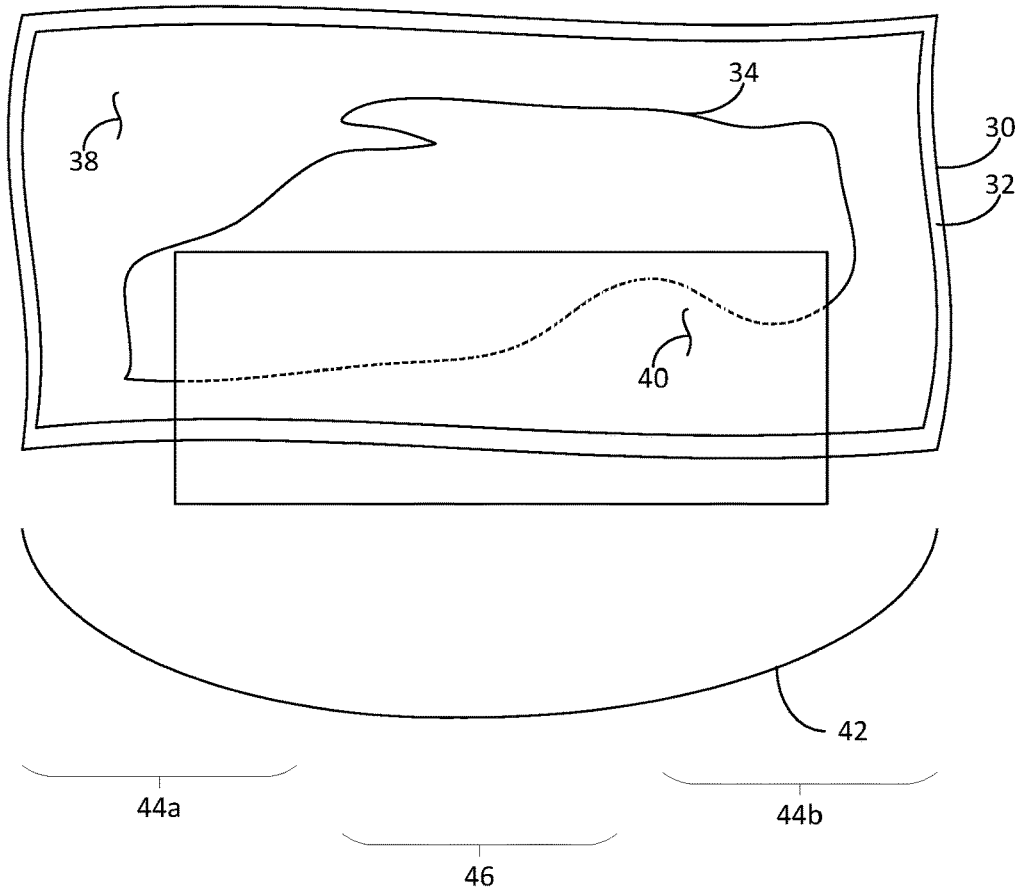
FIG. 3B is a front view of aspects of the system.
Figure 3C:
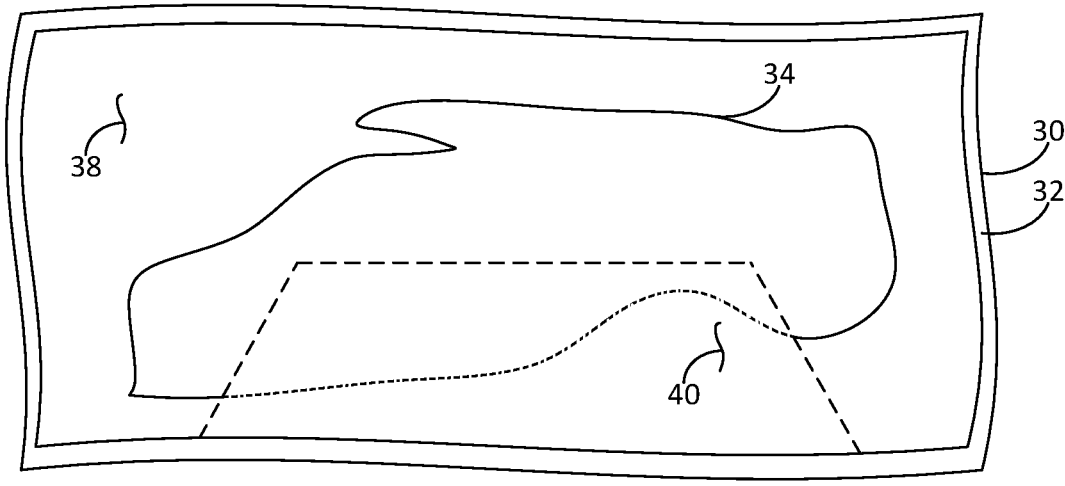
FIG. 3C is a front view of aspects of the system.

Referring to FIG. 3B, the fabric can include an image that cooperates with the footprint of the casket and urn and stand. The fabric 30 can include as image 34 that is designed to have a primary portion 38 and secondary portion 40. The primary portion 38 is designed to be visible from various viewing angles in viewing arc 42 so that primary portion is not obscured by the casket or urn and stand. The primary viewing image can provide sufficient content so that the image is identifiable to the audience to identify the customizing image for the celebration. The secondary portion 40 is also part of the customizing image for the celebration but is not necessary for the audience to identify the subject matter of the customizing image for the celebration. The secondary image can be visible at lateral ends 44a and 44b of the viewing arc but obscured from a center portion 46 of the viewing arc. Referring to FIG. 3C, the primary portion 38 can include lateral portions defined by sloping boundaries. These sloping boundaries allow the primary portion 38 to be viewable when the audience is not horizontally even with the primary portion.

The fabric can also be converted into a memorial article. For example, the fabric can be cut into sections such as section 36 (FIG. 3A). The section can be converted into a memorial article such as pillow, blanket of other article as a memorial of the deceased. In this example, the organizer could rent the fabric, then determine that the memorial is desired and purchase the fabric for subsequent conversion to a memorial article.

Figure 4A:
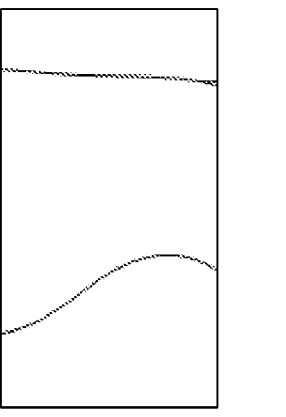
FIG. 4A is a front view of aspects of the system.
Figure 4A:
Figure 4B:
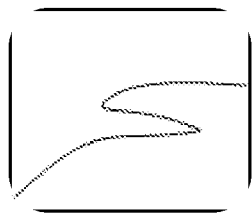
FIG. 4B is a front view of aspects of the system.

FIG. 4A shows a portion of the fabric converted into an article such as a blanket. FIG. 4B shows a portion of the fabric converted into an article such as a pillow.

Figure 5:
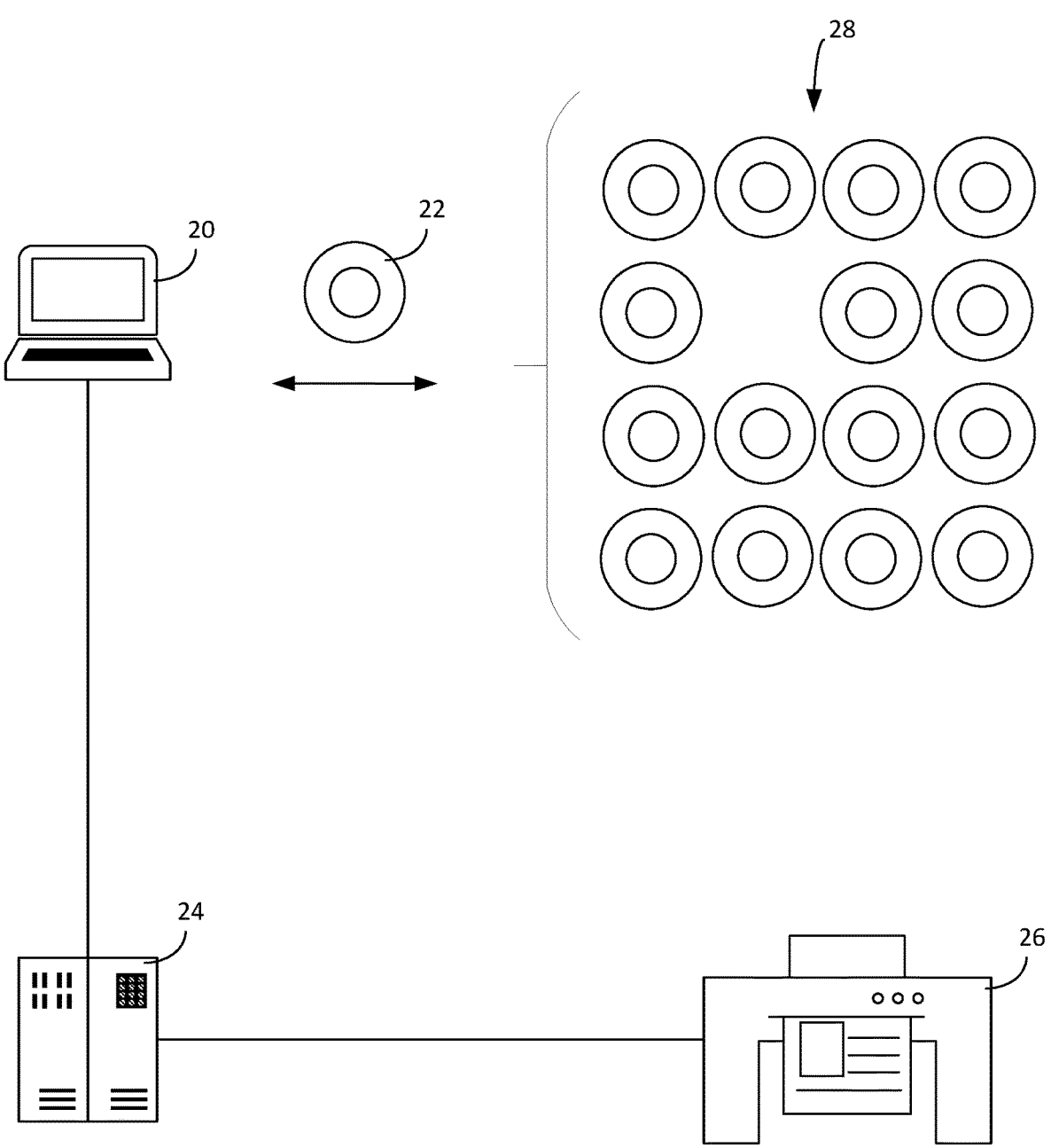
FIG. 5 is a schematic of aspects of the system.
Figure 6:
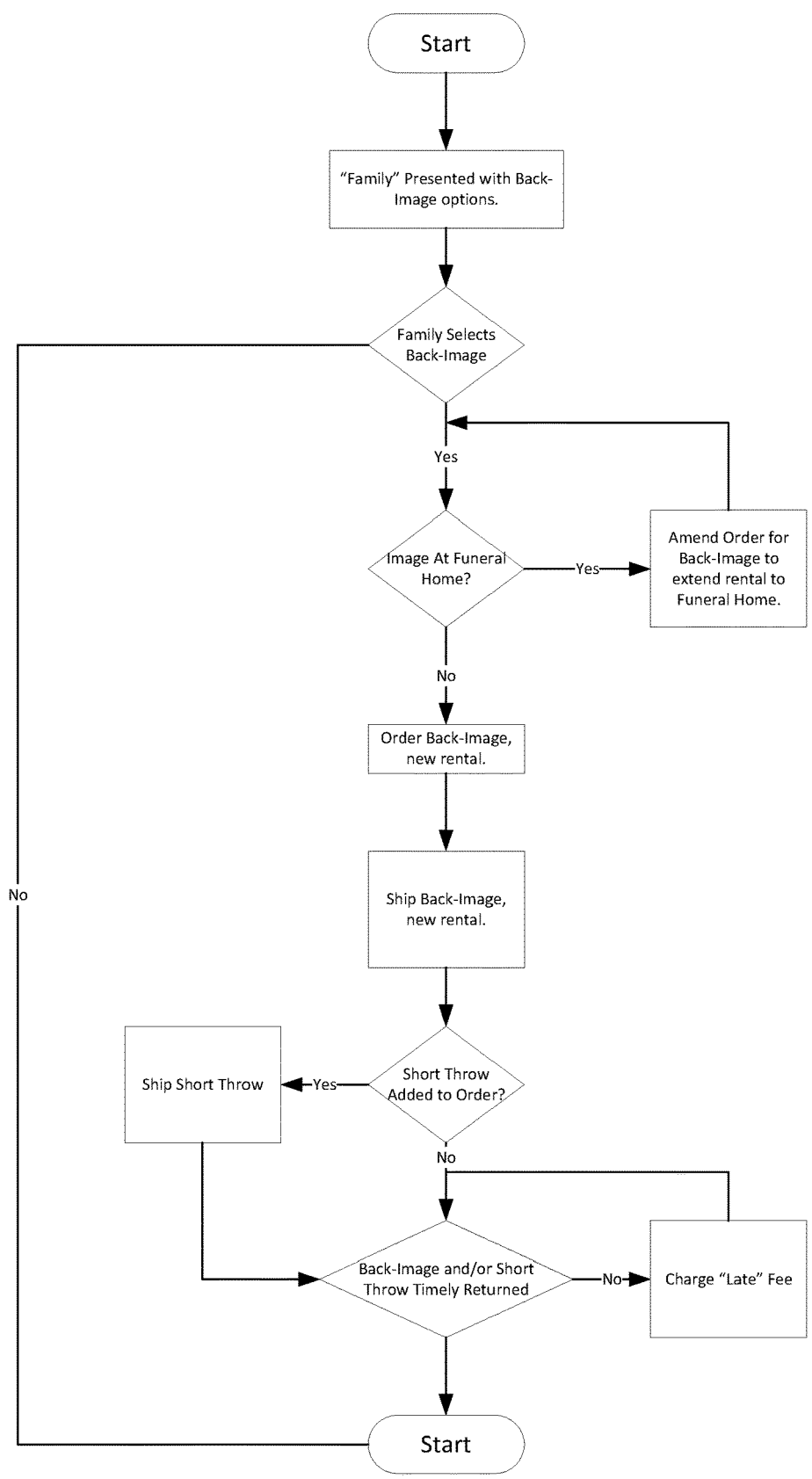
FIG. 6 is a flow chart of aspects of the system.

Referring to FIGS. 5 and 6, the physical location of the celebration of life (e.g. funeral home) or website can be used to allow the organizer or survivors to select a theme or background image from an inventory of images, such as via computer 20. The selected image 22 can then be removed from a remote inventory 28 and shipped to the appropriate location. Shipping can be accomplished in a few days since an inventory of images can be maintained. Billing system 24 can be used and associated with the image and can base fees on time of rental, events, and other factors. In some cases, time permitting, the image can be custom designed and imprinted on the fabric with printer or service 26. When the event is over, the fabric can be completed or even sold to the survivors for subsequent use (e.g. conversion into other products, segmented and framed, blankets, etc.).

Figure 7:
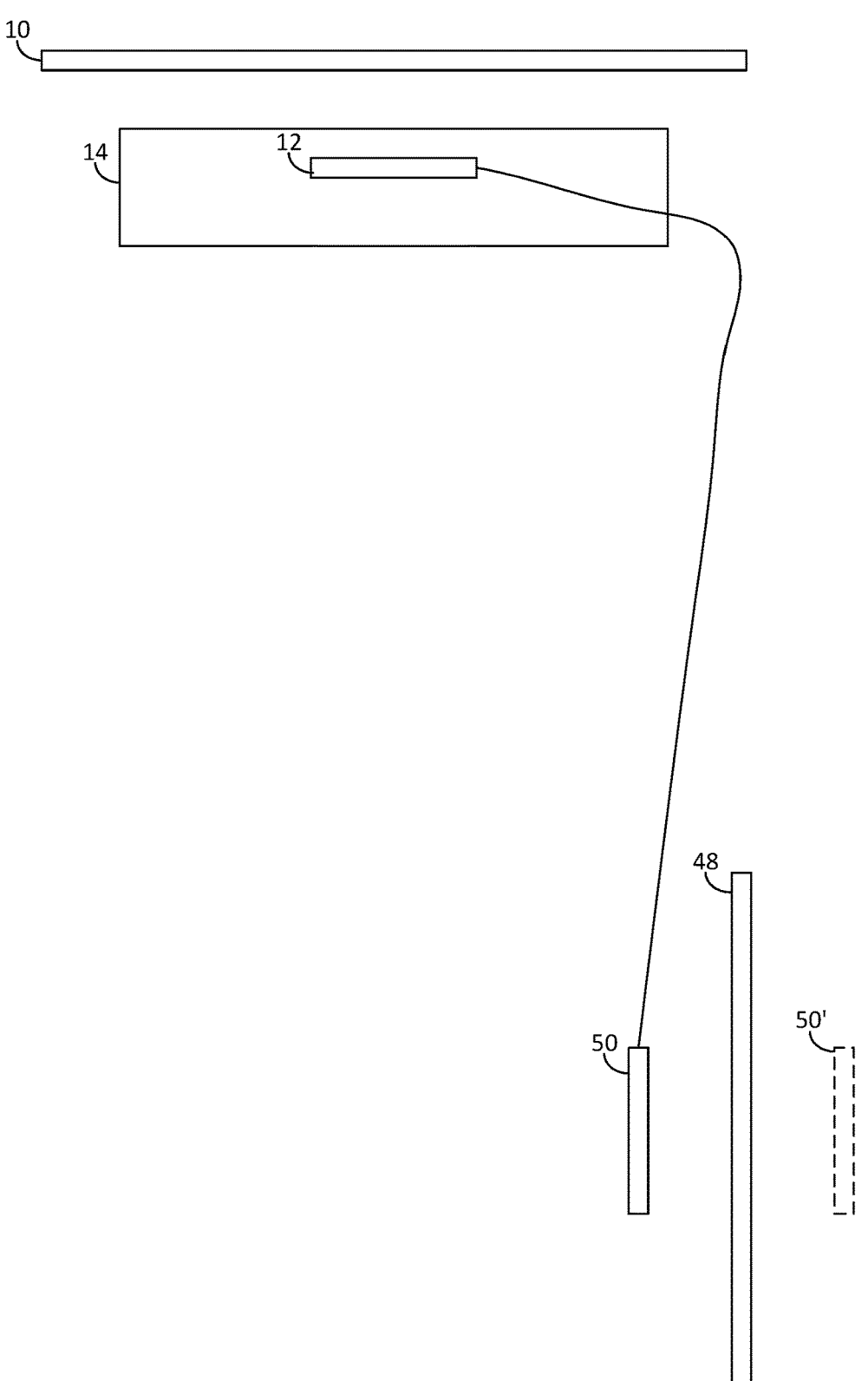
FIG. 7 is a schematic of aspects of the system.

Referring to FIG. 7, the frame 10 adapted to receive the fabric is positioned to the rear of casket 14 or urn and stand with projector 12 disposed vertically over the casket or urn and stand, directly above or offset from casket or urn and stand. A second frame 48 that includes a second screen or fabric and a second image. The first fabric of the first frame 10 can be cooperatively designed with the second image of the second frame so that the two images provide a customizing composite image for the celebration. For example, if an interest of the deceased were golf, the second image can be a fairway and the first image a green. The audience can be presented with images that can be temporarily, geography, categorically or otherwise associated.

The second image can be provided with a second projector 50 on the second screen where the second screen is blank. The second projector can be a forward projector 50 or rearward projector 50'. The second projector 50 can be in electronic communications with a first projector 12 so that any images that are displayed are coordinated. The second image can be disposed in a separate room than the first image so that a coordinated viewing experience is provided as the viewer passes from the second image to the first image. The second projector can be coordinated with the first projector where the first projector supplements the image of the first fabric. As the first projector adds supplemental images to the first fabric an associated image can be displayed from the second projector on the second screen. For example, the first projector can provide a visual effect representing the wind blowing while the second projector image can also show the wind blowing consistent with the projection of the first projector. Audio can also be provided that emulates the sound of wind consistent with the first and second projector.

The second projector can also include text and other content that is customized for the celebration. By combining at static customized image of the first screen with the dynamic flexibility of the second projector, the audience is provided with an experience that is customized and reflective of the deceased without risking the event resembling a video production. The first screen allows for a more dignified presentation for the celebration while the second screen, which can be disposed in a separate room, allows for text and other content that can change dynamically. Further, using a first fabric allows the viewing audience to focus on the ceremony and not be overly engaged with a digital presentation. Further, the fabric allows memorabilia to be created from the fabric as keepsakes, an option not readily available for digital video productions.

Figure 8:
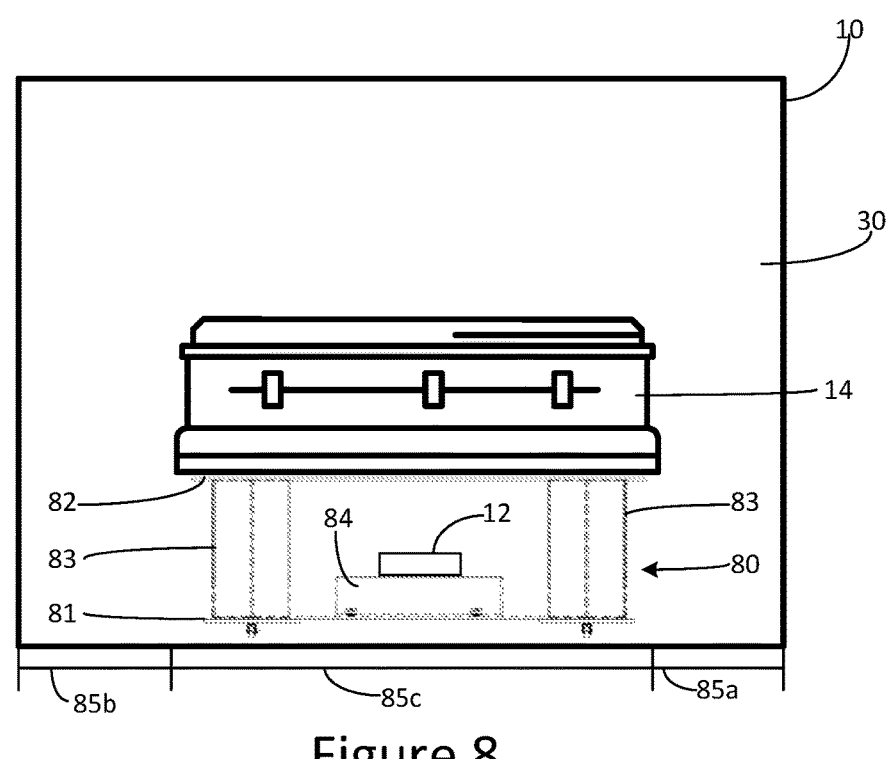
FIG. 8 is a front view of aspects of the system.
Figure 9:
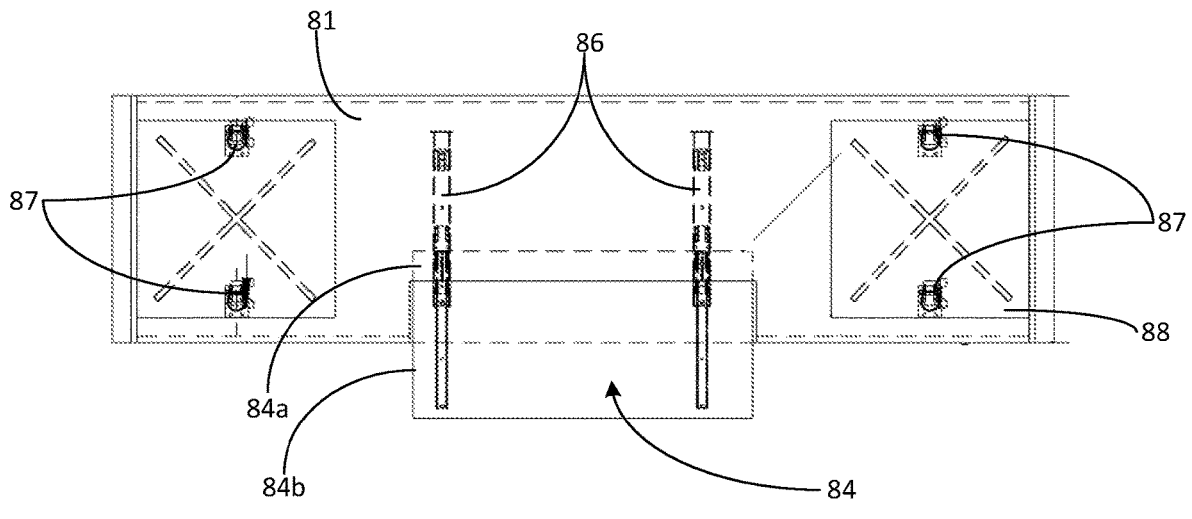
FIG. 9 is a bottom view of aspects of the system.
Figure 10:
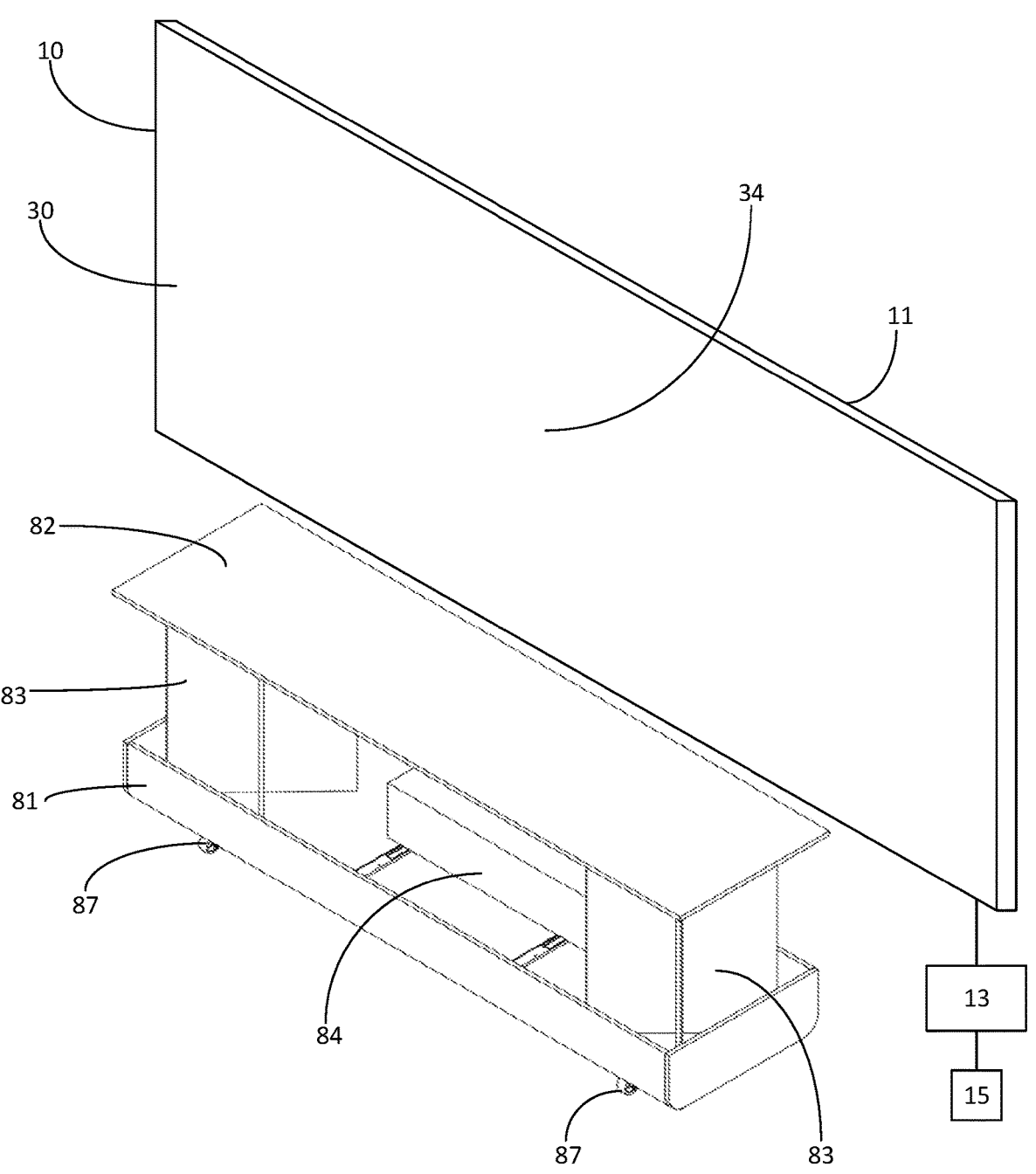
FIG. 10 is a perspective of aspects of the system.

Referring to FIGS. 8-10, the presentation system is shown having a frame 10 with a fabric 30 removably attached to the frame 10. An image 34 is printed on the fabric 30 which can be illuminated by a lighting system 11 disposed behind the fabric in frame 10. The lighting system includes a lighting controller 13 adapted to vary a brightness and a color of the lighting system. In one embodiment, the lighting controller 13 is actuated by a motion sensor 15.

A memorial container 14 is disposed in front of the fabric 30 and a stand 80 is included for carrying the memorial container 14 in front of the fabric 30. In the illustrated embodiment, the stand 80 includes a base section 81 and a top platform 82 interconnected by a pair of risers 83. The memorial container 14 is carried on the top platform 82. The stand 80 also includes a projector platform 84 operable between a retracted position 84a disposed within the stand, an extended position 84b disposed lateral outward from at least a portion of the stand, as best shown in FIG. 9.

A projector 12 is carried by the projector platform 84 displaying dynamic images on one of the fabric, the memorial container, and any combined portions thereof. In one embodiment, projector 12 is preferably a batter operated unit to facilitate easy of transportation and setup with stand 80. Alternatively, projector 12 may be a plug-in unit, in which the power cord can be routed through the base section 81 to an outlet. The image printed on the fabric, dynamic images displayed by the projector, the stand, and the memorial container cooperate to form a composite image when viewed by an audience. Additionally, the fabric extends from above the memorial container to the bottom of the stand. In the illustrated arrangement, the fabric 30 includes a right lateral portion 85a, a left lateral portion 85b and a central portion 85c. The right lateral portion extends past a first distal end of the memorial container when viewed from a front perspective by an audience. The left lateral portion extends past a second distal end of the memorial container opposite the first distal end when viewed from the front perspective by an audience.

In the illustrated embodiment of FIG. 8, the memorial container 14 is a casket, but may alternatively be an urn or other ceremonial representation item.

In one embodiment, at least one of the base section, the riser, the top platform and the projector platform are comprised of a transparent material. Preferably, at least the risers are comprised of a transparent material with the other element may be opaque material, thus allowing for more of the image on the fabric behind the stand to be visible when viewed from the front perspective by an audience.

As best show in the embodiment of FIG. 9, the projector platform 84 is carried on a pair of slidable rails 86 mounted to the base section for moving between the retracted and extended positions 84a, 84b. Additionally, the stand 80 preferably includes a plurality of casters 87 disposed on a bottom side 88 of the base section 81 to facilitate movement of the stand relative to the fabric to prepare the composite image.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A presentation system for a celebration of an individual comprising:

a frame;

a fabric removably attached to the frame;

an image printed on the fabric illuminated by a light source disposed behind the fabric;

a memorial container disposed in front of the fabric;

a stand having a base section and a top platform interconnected by at least one riser, wherein said memorial container is carried on said top platform;

a projector platform carried by said stand and operable between a retracted position disposed within said stand an extended position disposed lateral outward from at least a portion of said stand;

a projector carried by said projector platform displaying dynamic images on one of the fabric, the memorial container, and any combined portions thereof; and, wherein the image printed on the fabric, dynamic images displayed by said projector, the stand, and the memorial container cooperate to form a composite image when viewed by an audience, and wherein the fabric extends from above the memorial container to the bottom of the stand.

2. The presentation system of claim 1 wherein the memorial container is one of a casket or an urn.

3. The presentation system of claim 1 wherein at least one of said base section, said riser, said top platform and said projector platform are comprised of a transparent material.

4. The presentation system of claim 1 wherein said projector platform is carried on at least one slidable rail mounted to said base section for moving between said retracted and extended positions.

5. The presentation system of claim 1 wherein a plurality of casters are disposed on a bottom side of said base section to facilitate movement of said stand relative to said fabric to prepare said composite image.

\* \* \* \* \*